United States Patent
Kusner et al.

(10) Patent No.: US 7,941,292 B2
(45) Date of Patent: May 10, 2011

(54) ASSOCIATING OBSERVATIONS IN A MULTI-SENSOR SYSTEM USING AN ADAPTIVE GATE VALUE

(75) Inventors: Ronald R. Kusner, Harvard, MA (US); Herbert Landau, Bedford, MA (US); John-David Sergi, Gloucester, MA (US)

(73) Assignee: Raytheon Company, Waltham, MA (US)

( * ) Notice: Subject to any disclaimer, the term of this patent is extended or adjusted under 35 U.S.C. 154(b) by 492 days.

(21) Appl. No.: 12/114,134

(22) Filed: May 2, 2008

(65) Prior Publication Data
US 2009/0276183 A1  Nov. 5, 2009

(51) Int. Cl.
*G06F 17/18* (2006.01)
*G06F 15/00* (2006.01)
(52) U.S. Cl. .............. 702/181; 342/96; 706/45
(58) Field of Classification Search .......... 702/143, 702/144, 181, 189, 196, 185; 342/96; 382/103, 382/105; 701/70; 706/45
See application file for complete search history.

(56) References Cited

U.S. PATENT DOCUMENTS
5,798,942 A * 8/1998 Danchick et al. ........... 342/96
7,092,924 B1   8/2006 Levedahl
* cited by examiner

*Primary Examiner* — John H Le
(74) *Attorney, Agent, or Firm* — Daly, Crowley, Mofford & Durkee, LLP

(57) ABSTRACT

In one aspect, a method to assign observations includes receiving first observations of a first sensor system, receiving second observations of a second sensor system and assigning a set of pairs of the first and second observations predicted to correspond to the same physical position. The assigning includes using a likelihood function that specifies a likelihood for each assigned pair. The likelihood is dependent on the assignment of any other assigned pairs in the set of assigned pairs. The assigning also includes determining the set of assigned pairs for the first and second observations based on the likelihood function. The likelihood function uses a gate value determined from estimating a true volume using nearest neighbor distances determined from the first and second observations.

20 Claims, 4 Drawing Sheets

US 7,941,292 B2

ASSOCIATING OBSERVATIONS IN A MULTI-SENSOR SYSTEM USING AN ADAPTIVE GATE VALUE

BACKGROUND

In multi-sensor tracking systems a process of associating sets of observations from at least two sensor systems is problematic in the presence of bias, random errors, false observations, and missed observations. For example, one tracking system may share data with the other system and transmit its current set of its observations to the other sensor system. The second sensor system determines which data points received from the first sensor system correspond to the airplanes it is also tracking. In practice, the process is difficult because each sensor system has an associated error, making it problematic to assign a data point from one sensor system to the other sensor system. Examples of errors may include misalignment between the two sensor systems, different levels of tolerances, and/or one sensor system may observe certain types of airplanes while the other sensor system does not observe the same types of aircraft. Therefore, based on each particular sensor system having errors due to bias, random errors, false observations, and missed observations, it is difficult to use a set of data received from the first sensor system and directly overlay it with a set of data from the second sensor system.

SUMMARY

In one aspect, a method to assign observations includes receiving first observations of a first sensor system, receiving second observations of a second sensor system and assigning a set of pairs of the first and second observations predicted to correspond to the same physical position. The assigning includes using a likelihood function that specifies a likelihood for each assigned pair and determining the set of assigned pairs for the first and second observations based on the likelihood function. The likelihood function uses a gate value determined from estimating a true volume using nearest neighbor distances determined from the first and second observations.

In another aspect, an article includes a machine-readable medium that stores executable instructions to assign observations. The instructions cause a machine to receive first observations of a first sensor system, receive second observations of a second sensor system and assign a set of pairs of the first and second observations predicted to correspond to the same physical position. The instructions causing a machine to assign includes instructions causing a machine to use a likelihood function that specifies a likelihood for each assigned pair and determine the set of assigned pairs for the first and second observations based on the likelihood function. The likelihood function uses a gate value determined from estimating a true volume using nearest neighbor distances determined from the first and second observations.

In a further aspect, an apparatus includes circuitry to receive first observations of a first sensor system, receive second observations of a second sensor system and assign a set of pairs of the first and second observations predicted to correspond to the same physical position. The circuitry to assign includes circuitry to use a likelihood function that specifies a likelihood for each assigned pair and determine the set of assigned pairs for the first and second observations based on the likelihood function. The likelihood function uses a gate value determined from estimating a true volume using nearest neighbor distances determined from the first and second observations.

DETAILED DESCRIPTION

Figure 1:
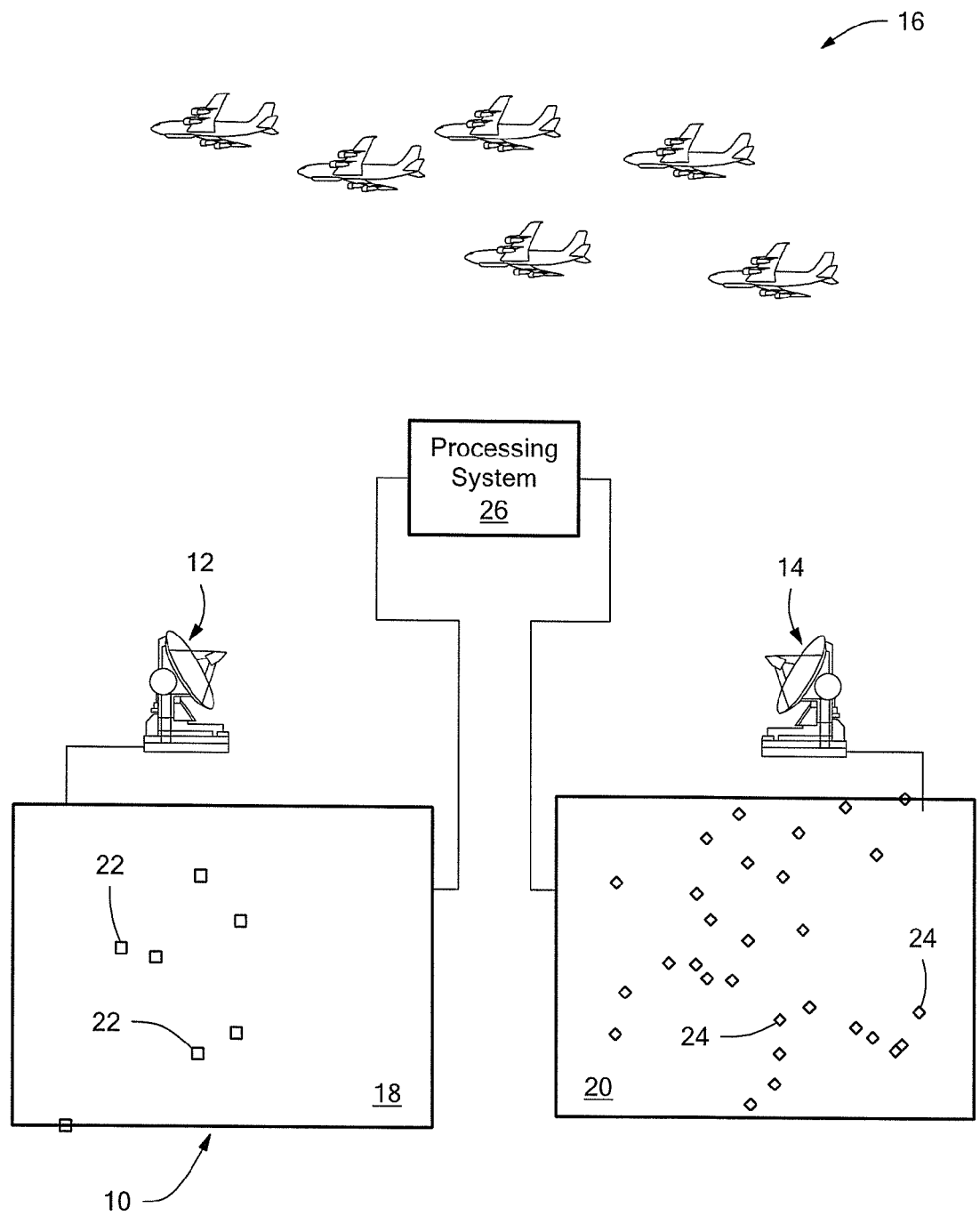
FIG. 1 is a diagram of a multi-sensor system.

Referring to FIG. 1, a multi-sensor system 10 includes a sensor system 12 and a sensor system 14 each of which is configured to observe the position and velocity of objects (e.g., airplanes 16). The multi-sensor system 10 also includes a multi-sensor processing system 26. Observations may occur through sensing, prediction, or a combination of sensing and prediction. In one example, the sensor system 12 and the sensor system 14 are radar systems. In other examples, one or more of the sensor systems 12, 14 may be an electro-optic sensor system, an infrared sensor system and so forth. For simplicity, not all airplanes 16 that are used herein are depicted in FIG. 1.

Associated with, or included within, the sensor system 12 is a representation 18 of positions of airplanes 16 that are observed by sensor system 12. Sensor system 14 is associated with a similar representation 20. Representations 18 and 20 may differ for a variety of reasons. For example, there may be a misalignment between the sensor systems 12 and 14, errors between the sensor systems 12 and 14, or one sensor system may not observe all of airplanes 16 that the other sensor system observes. The errors for either sensor system 12 or 14 may be due to bias, random errors, false observations, missed observations, or other sources. Representation 18 includes observations 22 representing positions of the corresponding airplanes 16 observed by the sensor system 12. Representation 20 includes observations 24 representing positions of the corresponding airplanes 16 observed by the sensor system 14. The physical position of any airplane 16 is an example of a physical parameter, observation of which is represented by observations 22 and 24.

In one example, the sensor system 12 may provide the observations 22 to the sensor system 14. A problem may arise with the sharing of observations when correlating which the observations 24 correspond to which the observations 22. This may be particularly difficult in the situation where the sensor system 12 includes the observations 22 corresponding to airplanes 16 that the sensor system 14 does not also observe. Persistent bias within or between sensor systems 12 and 14 also makes this problem particularly difficult.

The observations 22 are assigned to observations 24 by calculating a likelihood function indicative of differences between observations 22 and observations values 24 using the multi-sensor processing system 26.

Prior attempts to determine the likelihood function relied on Global Nearest Neighbor (GNN) techniques, but the GNN techniques do not take in to account the random and correlated bias components. On the other hand, a Global Nearest Pattern (GNP) technique determines a likelihood function that does account for the random and correlated bias components. For example, one such method to determine the likelihood function using a GNP technique is described in U.S. Pat. No. 7,092,924 which is assigned to the same assignee as this patent application and is incorporated herein in its entirety. An observation assignment using GNP accounts for persistent errors and the possibility that observations to be assigned may not constitute a perfect subset of the observation set to which they are being assigned.

Figure 2:
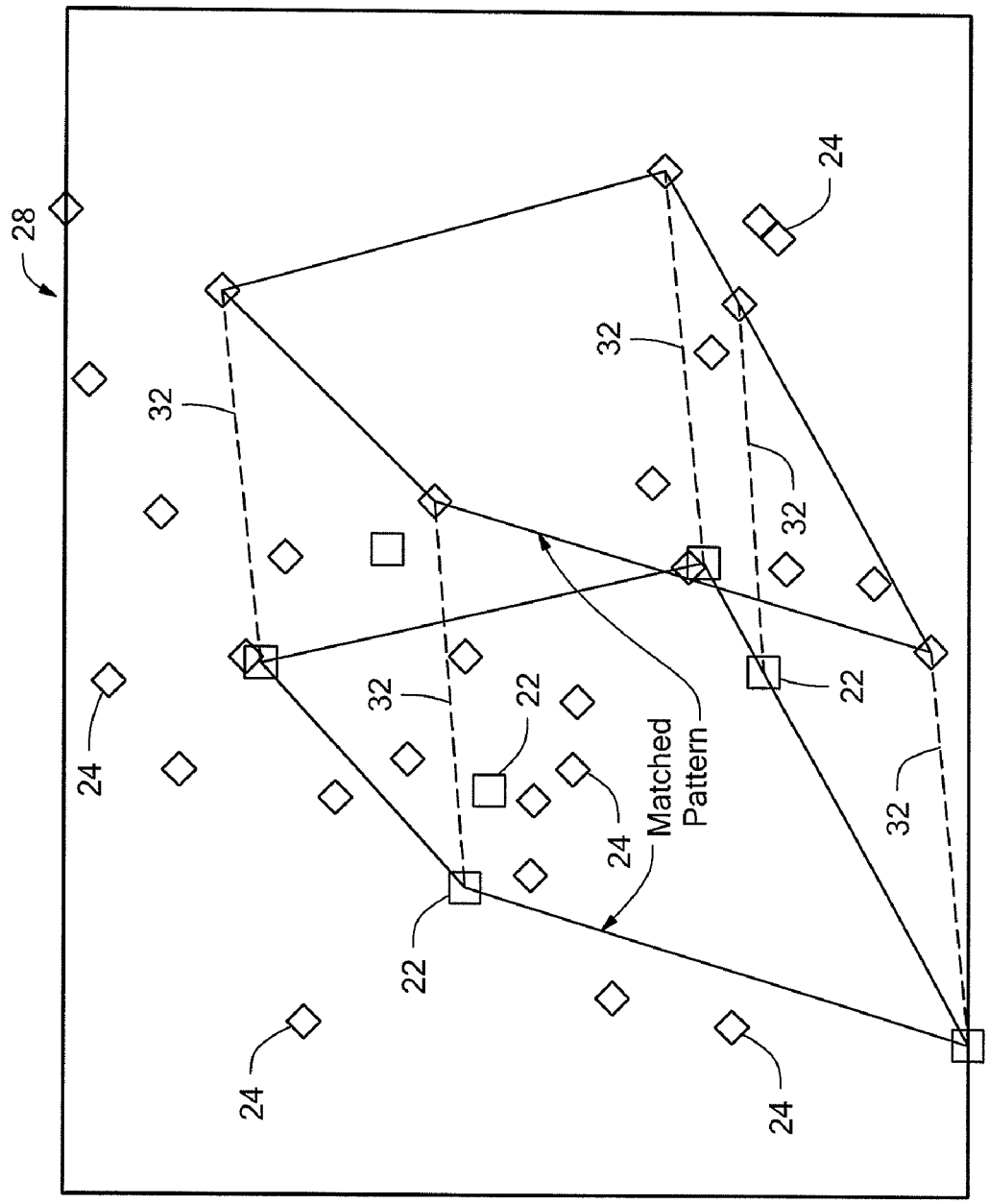
FIG. 2 is a diagram of assigning observations using the multi-sensor system of FIG. 1.

Referring to FIG. 2, a data set 28 includes observations 22, observations 24, and assignments 32 corresponding to associations made between observations 22 and observations 24 predicted to correspond to the same physical parameter. In this embodiment, the assignments in the data set 28 account for both random and correlated bias components. The assignments 32 of data set 28 are made based on errors having both random and correlated bias components, generating a common pattern, and assigning observations 22 to observations 24 accordingly. In this example, a persistent offset exists between observations 22 and observations 24, as indicated in FIG. 2.

The likelihood function of the GNP assumes that there are N objects (airplanes 16 in this example) in space being observed by sensor system A (e.g., sensor system 12 in the example of FIG. 1) and sensor system B (e.g., sensor system 14 in the example of FIG. 1), and each sensor system observes a potentially different subset of the objects. Sensor system A determines observations (observations 22 in the example of FIG. 1) on m of these, sensor system B determines observations (observations 24 in the example of FIG. 1) on n of these subject to:

$$m \leq n \leq N$$

False observations in sensor system A or sensor system B correspond to observations of a non-existent object. The observations are transformed to a D-dimensional common reference frame. The likelihood function in GNP is:

$$J_a = -(\overline{X}(CM_{Bias})^{-1}\overline{X}^T) - \sum_{i=1}^{m}\left\{\begin{matrix} \delta X_i(S_i)^{-1}\delta X_i^T + LN(|S_i|) - LN(C_{min}) \\ G - LN(C_{min}) \end{matrix}\right\} \text{ if } \left\{\begin{matrix} a(i) \neq 0 \\ a(i) = 0 \end{matrix}\right\} \quad (1)$$

where $\alpha(i)$ is an association vector (i=1 to m) and is equal to an index of sensor system B object with which ith sensor system A object is associated (i.e., 0 for non-association). $S_i$ is a residual error covariance equal to $CM_A(i)+CM_B(\alpha(i))$, where $CM_A(i)$ is a D×D error covariance matrix for sensor system A and $CM_B(\alpha(i))$ is a D×D error covariance matrix for sensor system B. $\overline{X}$ is an estimate of the relative bias and $$\overline{X} = \left[\sum_{i=1}^{m}(SV_A(i) - SV_B(a(i)) \cdot (S_i)^{-1}\right] \cdot \left[(CM_{BIAS})^{-1} + \sum_{i=1}^{m}(S_i)^{-1}\right]^{-1}$$

where each sum over those i for which $a(i) \neq 0$. $SV_A(i)$ is a D-dimensional state vector for sensor system A and $SV_B(\alpha(i))$ is a D-dimensional state vector for the sensor system B. $\delta X_i$ is a state vector difference where $\delta X_i = SV_A(i) - SV_B(\alpha(i)) - \overline{X}$. $CM_{bias}$ is a D×D intersensor bias covariance matrix, G is a gate value. $C_{min}$ is a minimum determinant of a residual error matrix where $C_{min} = \text{MIN}\{1, \text{MIN}(|S_i|)_i\}$ is a normalization constant.

In prior art approaches, the gate value, G, (also known as a cost of non-association) is determined using:

$$G = 2LN\left[\frac{\beta_T P_{AB}}{(2\pi)^{\frac{D}{2}}\beta_{NA}\beta_{NB}}\right] \quad (2)$$

where D is the dimensionality of the data space, $\beta_T$ is a true object density, $P_{AB} = P_A P_B$ and is a true probability that any given object is observed by both sensor system A and sensor system B, $B_{NA} = P_B(1-P_A)\beta_T + \beta_{FA}$ and is a true density of sensor system A observations having no corresponding sensor system B observations, $B_{NB} = P_A(1-P_B)\beta_T + \beta_{FB}$ and is a true density of sensor system B observations having no corresponding sensor system A observations, $P_A$ is a true probability that any given object is observed by the sensor system A, $P_B$ is a true probability that any given object is observed by the sensor system B, $\beta_{FA}$ is a true false observation density of sensor system A and $\beta_{FB}$ is a true false observation density of sensor system B.

However, the equation for the gate value G in Equation (2) cannot be used in a practical application since most of the parameters used to determine the gate value are truth parameters which are unknown. Therefore, as described further herein, the prior art gate value is discarded in favor of a more useful gate value. In order to determine a more practical gate value, the following assumptions and analysis is made.

$\beta_{FA}$ and $\beta_{FB}$ are set to zero, on the assumption that no false tracks are likely, and $P_A$ and $P_B$ are estimated, based on a priori information, to be $P'_A$ and $P'_B$ respectfully so that $$G = 2LN\left[\frac{1}{[2\pi]^{D/2}[1-P'_A][1-P'_B]\beta_T}\right].$$

$\beta_T$ is substituted with $N_T/V_T$ where $N_T$ is the total number of truth objects and $V_T$ is the true volume in which the truth objects are randomly distributed. $N_T$ is approximated by $N_B/P'_B$ where $N_B$ is the number of objects observed by sensor system B so that $$G = 2LN\left[\frac{V_T P'_B}{[2\pi]^{D/2}[1-P'_A][1-P'_B]N_B}\right].$$

$V_T$ is the only unknown truth parameter, and is taken to be the volume over which the sensor B observations are distributed ($V_B$). $V_B$ is estimated using the average, measured nearest neighbor distance of each observation of sensor B. Since the nearest neighbor distance does not seem to be calculable for mixed units (e.g., position and velocity) the total volume is represented as a product of position volume and velocity volume. Therefore, $V_T$ is $K_V V_{B\_pos} V_{B\_vel}$ where $K_V$ is a proportionality constant, $V_{B\_pos}$ is the position volume and $V_{B\_vel}$ is the velocity volume (i.e., the volume in velocity space over which the truth objects are randomly distributed) so that $$G = 2LN\left[\frac{K_V P'_B V_{B\_pos} V_{B\_vel}}{[2\pi]^{D/2}[1-P'_A][1-P'_B]N_B}\right].$$

By an analysis of nearest neighbor distance in multi-dimensional space it has been determined that the position and velocity volumes can be determined according to $$V_{B\_pos} = \left\{ \begin{array}{l} N_B \left[ \dfrac{d_{B\_pos}}{K(D_{pos})} \right]^{D_{pos}/2} \\ 1 \end{array} \right\} \text{ for } \left\{ \begin{array}{l} D_{pos} > 0 \\ D_{pos} = 0 \end{array} \right\},$$

and $$V_{B\_vel} = \left\{ \begin{array}{l} N_B \left[ \dfrac{d_{B\_vel}}{K(D_{vel})} \right]^{D_{vel}/2} \\ 1 \end{array} \right\} \text{ for } \left\{ \begin{array}{l} D_{vel} > 0 \\ D_{vel} = 0 \end{array} \right\},$$

where K(D) is a constant equal to $\Gamma(1+1/D)\Gamma^{1/D}(D/2+1)/\sqrt{\pi}$ (where $\Gamma(\ )$ is the standard Gamma Function), and $D_{pos}$ and $D_{vel}$ are the number of position space and velocity space dimensions respectively. The average measured position space nearest neighbor distance, the average measured velocity space nearest neighbor distance for sensor B are calculated according to $$d_{B\_pos} = (N_B)^{-1} \sum_{i=1}^{N_B} \tilde{d}_{B\_pos}(i),$$

and $$d_{B\_vel} = (N_B)^{-1} \sum_{i=1}^{N_B} \tilde{d}_{B\_vel}(i),$$

respectively, where $d_{B\_pos}(i)$ is the measured nearest neighbor distance of ith sensor system B object in position space and equal to $d_{B\_pos}(i) = \text{Min}\{\text{MAG}[X_{B\_pos}(i) - X_{B\_pos(i)}]\}_{i=1:n}$, and $X_{B\_pos}(i)$ is the sensor B measured position of the ith object. $d_{B\_vel}(i)$ is a measured nearest neighbor distance of ith sensor system B object in velocity space and equal to $d_{B\_vel}(i) = \text{Min}\{\text{MAG}[X_{B\_vel}(i) - X_{B\_vel}(i)]\}_{i=1:n}$ and $X_{B\_vel}(i)$ is the sensor B measured velocity of the ith object.

$K_V$ is set equal to 1 based on an analysis of nearest neighbor distance and confirmed by simulation results. Thus, the gate value becomes $$G = 2LN \left[ \frac{P'_B \cdot V_{B\_pos} \cdot V_{B\_vel}}{[2\pi]^{D/2} \cdot [1 - P'_A] \cdot [1 - P'_B] \cdot N_B} \right] \quad (3)$$

where $D = D_{pos} + D_{vel}$. Note that the number of position space dimensions ($D_{pos}$) and the number of velocity space dimensions ($D_{vel}$) must either be equal to each other, or one must be zero.

Thus, using equation (3), the cost function in equation (1) is based on known parameters. In one example, $P'_A$ and $P'_B$ may range from 50% to 100% with little affect on the results of the cost function. Applicants have determined that $P'_A$ and $P'_B$ of 70% is preferred.

In one example, the dimensionality parameter, D. is 6 for two radar system where three dimensions are position dimensions in x, y and z space and three dimensions are velocity dimensions in x, y and z space. In another example, when one of the sensor systems is an electro-optic system, D is equal to 2 for angle/angle dimensions (azimuth and elevation).

Figure 3:
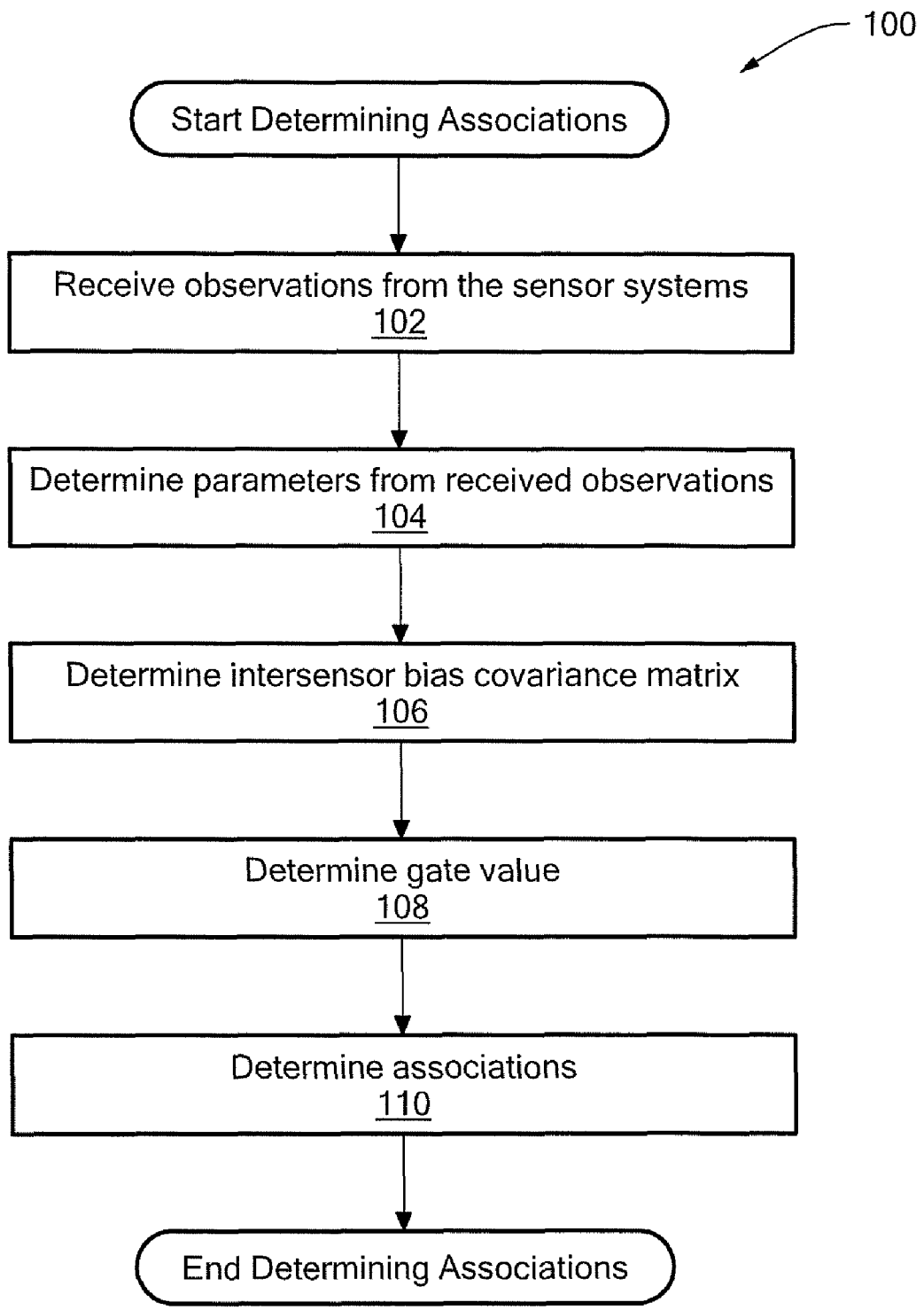
FIG. 3 is a flow chart of a process to associate observations.

Referring to FIG. 3, in one example, a process to associate observations from multi-sensor systems is a process 100. The multi-sensor processing system 26 receives observations from the sensor systems 12, 14 (102). Based on the observations received, the multi-sensor processing system 26 determines parameters (104). For example, the multi-sensor processing system 26 determines state vectors, $SV_A(i)$ and $SV_B(\alpha(i))$, and error covariance matrices, $CM_A(\alpha(i))$ and $CM_B(\alpha(i))$. The multi-sensor processing system 26 determines intersensor bias covariance matrix, $CM_{bias}$ (106). The multi-sensor processing system 26 determines the gate value (108). For example, equation (3) is used to determine the gate value. The multi-sensor processing system 26 determines associations (108). For example, the multi-sensor processing system 26 uses the parameters determined in processing blocks 104, 106 and 108 in the cost function in equation (1) to determine an association vector.

Figure 4:
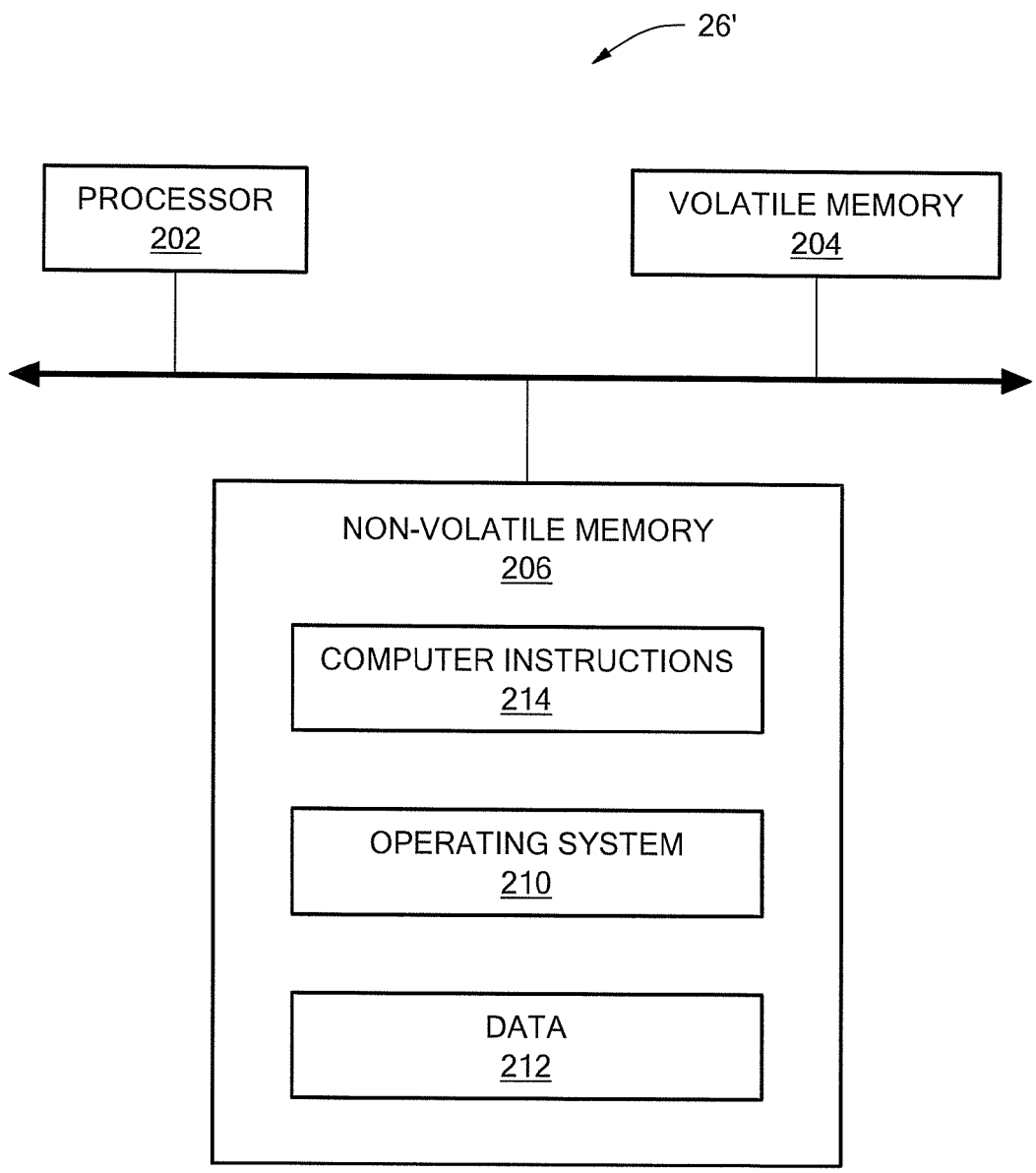
FIG. 4 is a block diagram of an example of a computer on which the process of FIG. 3 may be implemented.

Referring to FIG. 4, the multi-sensor processing system 26 may be configured as a multi-sensor processing system 26', for example. The multi-sensor processing system 26' includes a processor 202, a volatile memory 204 and a non-volatile memory 206 (e.g., hard disk). The non-volatile memory 206 stores computer instructions 214, an operating system 210 and data 212. In one example, the computer instructions 214 are executed by the processor 202 out of volatile memory 204 to perform the process 100.

Process 100 is not limited to use with the hardware and software of FIG. 4; it may find applicability in any computing or processing environment and with any type of machine or set of machines that is capable of running a computer program. Process 100 may be implemented in hardware, software, or a combination of the two. Process 100 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 100 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 100. Process 100 may also be implemented as a machine-readable storage medium, configured with a computer program, where upon execution, instructions in the computer program cause the computer to operate in accordance with process 100.

The processes described herein are not limited to the specific embodiments described. For example, in the problem of associating sets of observations from multi-sensor systems in the presence of inter-sensor observation bias, random observations errors, false observations and missed observations, Global Nearest Pattern (GNP) association provides a preferred solution both for the association of one sensor's observations to those of the other (or to non-assignment), and for the unknown bias between the two sensors. Global Nearest Neighbor (GNN) association assumes no inter-sensor observation bias, and solves for an association of one sensor's observations to those of the other (or to non-assignment). In the absence of inter-sensor observation bias, GNN yields the same preferred association result as the GNP result. Thus, the gate value of equation 3 may be used by both GNN and GNP techniques.

In another example, the process 100 is not limited to the specific processing order of FIG. 3, respectively. Rather, any of the processing blocks of FIG. 3 may be re-ordered, combined or removed, performed in parallel or in serial, as necessary, to achieve the results set forth above.

The processing blocks in FIG. 3 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A computer-implemented method comprising:
using a computer processor to assign observations comprising:
receiving first observations of a first sensor system;
receiving second observations of a second sensor system;
assigning a set of pairs of the first and second observations predicted to correspond to the same physical position, the assigning comprising:
using a likelihood function that specifies a likelihood for each assigned pair; and
determining the set of assigned pairs for the first and second observations based on the likelihood function,
wherein the likelihood function uses a gate value determined from estimating a true volume using nearest neighbor distances determined from the first and second observations.

2. The method of claim 1 wherein the gate value is determined based on false observations of each sensor system being zero.

3. The method of claim 2 wherein the gate value is determined by estimating true probabilities of observation for each sensors system using a priori data.

4. The method of claim 1 wherein the gate value is determined using an equation:

$$G = 2LN\left[\frac{P'_B \cdot V_{B\_pos} \cdot V_{B\_vel}}{[2\pi]^{D/2} \cdot [1 - P'_A] \cdot [1 - P'_B] \cdot N_B}\right],$$

wherein $P'_A$ is an estimated probability that any given object is observed by the first sensor system, $P'_B$ is an estimated probability that any given object is observed by the second sensor system B, K(D) is a constant equal to $\Gamma(1+1/D)\Gamma^{1/D}(D/2+1)/\sqrt{\pi}$, D is equal to $D_{pos} + D_{vel}$, $D_{pos}$ and $D_{vel}$ are the number of position space and velocity space dimensions respectively, $V_{B\_pos}$ is the position volume and $V_{B\_vel}$ is the velocity volume.

5. The method of claim 4 wherein the likelihood function is determined using an equation:

$$J_a = -\left(\overline{X}(CM_{Bias})^{-1}\overline{X}^T\right) - \sum_{i=1}^{m}\left\{\begin{array}{c}\delta X_i(S_i)^{-1}\delta X_i^T + \\ LN(|S_i|) - LN(C_{min}) \\ G - LN(C_{min})\end{array}\right\} \text{ if } \left\{\begin{array}{c}a(i) \neq 0 \\ a(i) = 0\end{array}\right\},$$

wherein where $\alpha(i)$ is an association vector (i =1 to m) and is equal to an index of an object of the second sensor system with which ith object of the first sensor system is associated, $S_i$ is a residual error covariance, $\overline{X}$ is an estimate of the relative bias, $\delta X_i$ is a state vector difference, $CM_{bias}$ is a D×D intersensor bias covariance matrix and $C_{min}$ is a minimum determinant of a residual error matrix.

6. The method of claim 5 wherein in an environment without biases, the likelihood function is determined using an equation:

$$J_a = -\sum_{i=1}^{m}\left\{\begin{array}{c}LN(|S_i|) - LN(C_{min}) \\ G - LN(C_{min})\end{array}\right\} \text{ if } \left\{\begin{array}{c}a(i) \neq 0 \\ a(i) = 0\end{array}\right\}.$$

7. The method of claim 4 wherein D is equal to 6.

8. The method of claim 4 wherein D is equal to 2.

9. The method of claim 1 wherein the likelihood is dependent on the assignment of any other assigned pairs in the set of assigned pairs.

10. An article comprising a non-transitory machine-readable medium that stores executable instructions to assign observations, the instructions causing a machine to:
receive first observations of a first sensor system;
receive second observations of a second sensor system;
assign a set of pairs of the first and second observations predicted to correspond to the same physical position, the instructions causing a machine to assign comprising instructions causing a machine to:
use a likelihood function that specifies a likelihood for each assigned pair; and
determine the set of assigned pairs for the first and second observations based on the likelihood function,
wherein the likelihood function uses a gate value determined from estimating a true volume using nearest neighbor distances determined from the first and second observations.

11. The article of claim 10 wherein the gate value is determined based on false observations of each sensor system being zero,
wherein the gate value is determined by estimating true probabilities of observation for each sensors system using a priori data.

12. The article of claim 11 wherein the gate value is determined using an equation:

$$G = 2LN\left[\frac{P'_B \cdot V_{B\_pos} \cdot V_{B\_vel}}{[2\pi]^{D/2} \cdot [1 - P'_A] \cdot [1 - P'_B] \cdot N_B}\right],$$

wherein $P'_A$ is an estimated probability that any given object is observed by the first sensor system, $P'_B$ is an estimated probability that any given object is observed by the second sensor system B, K(D) is a constant equal to $\Gamma(1+1/D)\Gamma^{1/D}(D/2+1)/\sqrt{\pi}$, D is equal to $D_{pos}+D_{Vel}$, $D_{pos}$ and $D_{vel}$ are the number of position space and velocity space dimensions respectively, $V_{B\_pos}$ is the position volume and $V_{B\_vel}$ is the velocity volume.

13. The article of claim 12 wherein the likelihood function is determined using an equation:

$$J_a = -\left(\overline{X}(CM_{Bias})^{-1}\overline{X}^T\right) - \sum_{i=1}^{m}\left\{\begin{array}{c}\delta X_i(S_i)^{-1}\delta X_i^T + \\ LN(|S_i|) - LN(C_{min}) \\ G - LN(C_{min})\end{array}\right\} \text{ if } \left\{\begin{array}{c}a(i) \neq 0 \\ a(i) = 0\end{array}\right\},$$

wherein where $\alpha(i)$ is an association vector (i=1 to m) and is equal to an index of an object of the second sensor system with which ith object of the first sensor system is associated, $S_i$ is a residual error covariance, $\overline{X}$ is an estimate of the relative bias, $\delta X_i$ is a state vector difference, $CM_{bias}$ is a D×D intersensor bias covariance matrix and $C_{min}$ is a minimum determinant of a residual error matrix.

14. The article of claim 13 wherein in an environment without biases, the likelihood function is determined using an equation:

$$J_a = -\sum_{i=1}^{m}\left\{\begin{array}{c}LN(|S_i|) - LN(C_{min}) \\ G - LN(C_{min})\end{array}\right\} \text{ if } \left\{\begin{array}{c}a(i) \neq 0 \\ a(i) = 0\end{array}\right\}.$$

15. The article of claim 10 wherein the likelihood is dependent on the assignment of any other assigned pairs in the set of assigned pairs.

16. An apparatus comprising:
circuitry to:
  receive first observations of a first sensor system;
  receive second observations of a second sensor system;
  assign a set of pairs of the first and second observations predicted to correspond to the same physical position, the assigning comprising:
    using a likelihood function that specifies a likelihood for each assigned pair; and
    determining the set of assigned pairs for the first and second observations based on the likelihood function,
  wherein the likelihood function uses a gate value determined from estimating a true volume using nearest neighbor distances determined from the first and second observations.

17. The apparatus of claim 16 wherein the circuitry comprises at least one of a processor, a memory, programmable logic and logic gates.

18. The apparatus of claim 16, wherein the likelihood is dependent on the assignment of any other assigned pairs in the set of assigned pairs,
  wherein the gate value is determined based on false observations of each sensor system being zero, and
  wherein the gate value is determined by estimating true probabilities of observation for each sensors system using a priori data.

19. The apparatus of claim 16 wherein the gate value is determined using an equation:

$$G = 2LN\left[\frac{P'_B \cdot V_{B\_pos} \cdot V_{B\_vel}}{[2\pi]^{D/2} \cdot [1-P'_A] \cdot [1-P'_B] \cdot N_B}\right],$$

wherein $P'_A$ is an estimated probability that any given object is observed by the first sensor system, $P'_B$ is an estimated probability that any given object is observed by the second sensor system B, K(D) is a constant equal to $\Gamma(1+1/D)\Gamma^{1/D}(D/2+1)/\sqrt{\pi}$, D is equal to $D_{pos}+D_{vel}$, $D_{pos}$ and $D_{vel}$ are the number of position space and velocity space dimensions respectively, $V_{B\_pos}$ is the position volume and $V_{B\_vel}$ is the velocity volume, and wherein the likelihood function is determined using an equation:

$$J_a = -\left(\overline{X}(CM_{Bias})^{-1}\overline{X}^T\right) - \sum_{i=1}^{m}\left\{\begin{array}{c}\delta X_i(S_i)^{-1}\delta X_i^T + \\ LN(|S_i|) - LN(C_{min}) \\ G - LN(C_{min})\end{array}\right\} \text{ if, } \left\{\begin{array}{c}a(i) \neq 0 \\ a(i) = 0\end{array}\right\}$$

wherein where $\alpha(i)$ is an association vector (i=1 to m) and is equal to an index of an object of the second sensor system with which ith object of the first sensor system is associated, $S_i$ is a residual error covariance, $\overline{X}$ is an estimate of the relative bias, $\delta X_i$ is a state vector difference, $CM_{bias}$ is a D×D intersensor bias covariance matrix and $C_{min}$ is a minimum determinant of a residual error matrix.

20. The apparatus of claim 19 wherein in an environment without biases, the likelihood function is determined using an equation:

$$J_a = -\sum_{i=1}^{m}\left\{\begin{array}{c}LN(|S_i|) - LN(C_{min}) \\ G - LN(C_{min})\end{array}\right\} \text{ if } \left\{\begin{array}{c}a(i) \neq 0 \\ a(i) = 0\end{array}\right\}.$$

* * * * *